(12) United States Patent
Dropmann et al.

(10) Patent No.: US 9,778,015 B2
(45) Date of Patent: Oct. 3, 2017

(54) PISTON-CYLINDER UNIT WITH EVALUATION UNIT FOR DETERMINING THE PISTON POSITION

(71) Applicant: Liebherr-Elektronik GmbH, Lindau (DE)

(72) Inventors: Markus Dropmann, Lindau (DE); Alfred Engler, Sigmarszell (DE)

(73) Assignee: Liebherr-Elektronik GmbH, Lindau (DE)

( * ) Notice: Subject to any disclaimer, the term of this patent is extended or adjusted under 35 U.S.C. 154(b) by 341 days.

(21) Appl. No.: 14/530,279

(22) Filed: Oct. 31, 2014

(65) Prior Publication Data

US 2015/0114220 A1    Apr. 30, 2015

(30) Foreign Application Priority Data

Oct. 31, 2013  (DE) .................. 10 2013 018 342

(51) Int. Cl.
  *F16J 1/12*    (2006.01)
  *G01B 7/00*   (2006.01)
  *F16J 10/02*  (2006.01)
  *F15B 15/28*  (2006.01)

(52) U.S. Cl.
  CPC .......... *G01B 7/003* (2013.01); *F15B 15/2815* (2013.01); *F16J 1/12* (2013.01); *F16J 10/02* (2013.01)

(58) Field of Classification Search
  CPC .......................... G01B 7/003; F15B 15/2815
  USPC .................................... 91/1; 92/5 R
  See application file for complete search history.

(56) References Cited

U.S. PATENT DOCUMENTS

| | | | | |
|---|---|---|---|---|
| 4,587,850 A | * | 5/1986 | Moser | F15B 15/2861 267/64.11 |
| 4,901,628 A | * | 2/1990 | Krage | F15B 15/2869 324/639 |
| 5,560,278 A | * | 10/1996 | Lark | F15B 15/2869 277/321 |
| 5,608,332 A | * | 3/1997 | Crayton | F15B 15/28 324/633 |
| 5,901,633 A | * | 5/1999 | Chan | F15B 15/28 92/5 R |

(Continued)

FOREIGN PATENT DOCUMENTS

DE   19537877 A1   4/1996
DE   2300714 A    11/1996

(Continued)

OTHER PUBLICATIONS

German Patent and Trademark Office, Search Report of German Patent Application No. 102013018342.1, Jul. 10, 2014, 10 pages.

*Primary Examiner* — Thomas E Lazo
(74) *Attorney, Agent, or Firm* — McCoy Russell LLP

(57) ABSTRACT

The present disclosure relates to a piston-cylinder unit with a cylinder jacket and a piston rod longitudinally shiftably guided in the cylinder jacket as well as an evaluation unit which determines the position of the piston rod with respect to the cylinder jacket by the intrinsic electrical properties of an interconnection of cylinder jacket, piston rod and piston, wherein the piston rod is short-circuited against the cylinder or the cylinder head in a manner suitable for high frequencies via one or more contact elements in the region of the exit opening of the piston rod out of the cylinder head.

18 Claims, 2 Drawing Sheets

(56) References Cited

U.S. PATENT DOCUMENTS

| | | | | |
|---|---|---|---|---|
| 7,451,684 B2* | 11/2008 | Muller | ............... | F15B 15/2892 |
| | | | | 91/1 |
| 7,931,403 B2* | 4/2011 | Fish | .................. | B32B 1/08 |
| | | | | 384/29 |
| 8,117,908 B2* | 2/2012 | Engler | ............... | F15B 15/2853 |
| | | | | 73/1.68 |
| 2006/0087314 A1* | 4/2006 | Zhu | ................. | G01D 5/165 |
| | | | | 324/207.17 |
| 2012/0174771 A1* | 7/2012 | De Maglie | ......... | F15B 15/2869 |
| | | | | 92/5 R |

FOREIGN PATENT DOCUMENTS

| | | |
|---|---|---|
| DE | 202008010230 U1 | 1/2010 |
| DE | 102011008381 A1 | 7/2012 |
| EP | 2476916 A2 | 7/2012 |

* cited by examiner

PISTON-CYLINDER UNIT WITH EVALUATION UNIT FOR DETERMINING THE PISTON POSITION

CROSS REFERENCE TO RELATED APPLICATION

This application claims priority to German Patent Application No. 10 2013 018 342.1 entitled "Piston-Cylinder Unit with Evaluation Unit for Determining the Piston Position," filed Oct. 31, 2013, which is hereby incorporated by reference in its entirety for all purposes.

TECHNICAL FIELD

This present disclosure relates to a piston-cylinder unit with a cylinder jacket, a piston rod longitudinally shiftably guided in the cylinder jacket, and an evaluation unit which determines the position of the piston rod with respect to the cylinder jacket on the basis of the intrinsic electrical properties of the piston-cylinder unit.

BACKGROUND AND SUMMARY

Determining the position of a cylinder piston as exactly as possible is a prerequisite for a number of technical applications, such as for example the automated actuation of a piston-cylinder unit of a construction machine or a hoisting implement by using the exact piston position as control variable. In addition, determining the position can contribute to an increase of the operational safety, as the inlet of the hydraulic medium, in particular the hydraulic fluid, in extreme positions of the cylinder piston must be controlled exactly and hence be stopped in time.

Beside the conventional measurement methods, which determine the current piston position by arranged cable-pull potentiometers or on the basis of a magnetostrictive principle, further measurement methods have emerged, which provide for determining the piston position on the basis of the electrical properties of the piston-cylinder unit. When the current piston position changes, this will influence the intrinsic electrical properties of the cylinder. The evaluation of the electrical properties is effected by an evaluation unit which is connected with the piston rod and the cylinder jacket and possibly operates with high-frequency signals.

At present, grounding of the piston rod is practiced at its extended ends, i.e. in the region of the piston rod eye at which the introduction of force into the mechanism is started. Via its length, however, the piston rod portion extended from the piston acts as antenna structure, whereby disturbing influences such as for example EMC, EMI from the environment act on the position determining system. Especially when using a measurement method on the basis of high-frequency evaluation signals, disturbing EMC, EMI effects can influence the accuracy of the position determining system. The mode of operation of surrounding electric and electronic components likewise can be influenced by a high-frequency radiation.

Therefore, it is the objective of the present disclosure to develop a piston-cylinder unit with such position measuring device, which reduces the influence of problematic signal couplings into and out of the piston rod.

This object is solved by a piston-cylinder unit with a cylinder jacket and a piston rod longitudinally shiftably guided in the cylinder jacket. The operating principle of the piston-cylinder unit can be pneumatic or hydraulic. The piston-cylinder unit comprises an evaluation unit which determines the position of the piston rod with respect to the cylinder jacket on the basis of the intrinsic electrical properties of the piston-cylinder unit. For this purpose, the evaluation unit on the one hand is connected with the piston rod and on the other hand with the cylinder jacket and can determine the intrinsic electrical properties of the piston-cylinder unit in dependence on the piston position via a corresponding evaluation electronic.

According to the present disclosure, the piston rod is short-circuited against the cylinder or the cylinder head in a manner suitable for high frequencies via one or more contact elements in the region of the exit opening of the piston rod out of the cylinder head. By early grounding of the piston rod, i.e. in the region of the exit opening, the influence of the extended piston rod acting as antenna structure is suppressed. Furthermore, the influence of the emission of the produced measurement signals of the evaluation electronic on the surrounding electric and/or electronic components can be reduced.

Grounding can be effected via a contact of the cylinder head with the cylinder, when the cylinder is connected with the machine chassis due to its mounting position. In this way, a contact of the piston rod to the cylinder potential very effective in terms of high frequency is achieved, whereby improvements in the suppression of emitted and irradiated electromagnetic signals are obtained. This increases the insensitivity to EMI and reduces the electromagnetic radiation of the active evaluation electronic.

Grounding can be effected via a conductive connection between piston rod and cylinder head, for example by one or more sliding contacts etc. In this case, it is conceivable that the evaluation electronic is at least partly arranged within the cylinder head and is connected with the piston rod and the cylinder jacket. The connection/contacting of the evaluation electronic with the piston rod at least should be effected within the cylinder head, i.e. between short-circuit contact and piston.

The short circuit caused by the grounding according to the present disclosure possibly can be prevented by the intrinsic evaluation of the piston-cylinder unit. This short circuit may be resolved by including at least one shielding impedance, which is connected in parallel with the intrinsically electrical properties of the piston-cylinder unit. In other words, the at least one shielding impedance is connected in series with the short-circuit path, i.e. in series with the piston rod and the short-circuit contact. By introducing the series impedance, the short-circuit branch formed by grounding the piston rod can again be resolved in terms of high frequency.

The at least one shielding impedance may include a frequency-dependent impedance. The shielding impedance can comprise a shielding ring of a permeable material, which is coaxially seated on the piston rod. In an example aspect of the present disclosure, the shielding impedance is arranged between the connection of the evaluation unit to the piston rod and the short-circuit contact, whereby a series connection of evaluation unit and shielding impedance to the grounding or cylinder potential is obtained.

It is possible to galvanically connect the evaluation unit with the piston rod. Alternatively, a capacitive connection of the evaluation unit is possible. In this case, the connection of the evaluation unit can be effected by a dielectrically insulated counterelectrode, which is guided concentrically or partly concentrically around the piston rod. The counterelectrode may be galvanically connected with the evaluation unit.

When the shielding impedance is connected in series with the evaluation unit, small changes in resistance have less influence on the measurement. The system thereby is shielded such that a higher impedance during the connection, in particular during a capacitive coupling with the piston rod, is admissible. In the case of the capacitive coupling, a tolerable higher impedance would allow a reduction in surface area or volume of the connection, which involves certain advantages with regard to the narrow space conditions within the cylinder head.

In an example aspect of the present disclosure, the evaluation unit of the piston-cylinder unit determines the current piston position on the basis of the inductive and/or ohmic properties of the conduction path formed between cylinder jacket, piston and piston rod. It therefore is expedient when the piston and the cylinder jacket are conductively connected with each other by an electrically conductive piston ring or sliding contact. The piston ring or sliding contact for this purpose is arranged between piston and cylinder jacket.

The evaluation of these inductive and ohmic variables can be effected by evaluation methods based both on alternating voltage and on direct voltage. For this purpose, the evaluation unit is provided with a corresponding evaluation electronic.

Alternatively, it is possible that the evaluation unit determines the piston position on the basis of the intrinsic capacitance of the capacitor formed by the cylinder jacket, the piston rod and a medium acting as dielectric within the cylinder jacket. The evaluation unit uses an oscillator circuit for the capacitance determination of the capacitance formed of piston and cylinder jacket.

Furthermore, it is possible that the evaluation unit determines the resonance behavior of the resonant circuit formed of cylinder jacket, piston rod and piston. The necessary capacitance of the resonant circuit is formed by the cylinder jacket and the piston rod, wherein a medium contained in the cylinder jacket, for example hydraulic oil, acts as dielectric. The conduction paths or the evaluation electronic act as inductance of the resonant circuit. For example, by excitation by an oscillator a vibration is produced within the resonant circuit formed, which is evaluated correspondingly via the evaluation unit.

Beside the piston-cylinder unit according to the present disclosure, the present disclosure relates to machine or working machine, in particular construction machine, hoisting implement, industrial machine, machine tool or aircraft with a corresponding piston-cylinder unit according to the present disclosure. The machine obviously has the same advantages and properties as the piston-cylinder unit according to the present disclosure, which is why a repetitive description will be omitted at this point. Inside an aircraft, the piston-cylinder unit according to the present disclosure may be used for the landing gear system or flight control actuators.

Further advantages and properties of the present disclosure will be explained in detail below with reference to the exemplary embodiment illustrated in the Figures. Note also that the inventors herein have recognized the above issues, which are not admitted to be well known.

DETAILED DESCRIPTION

Figure 1:
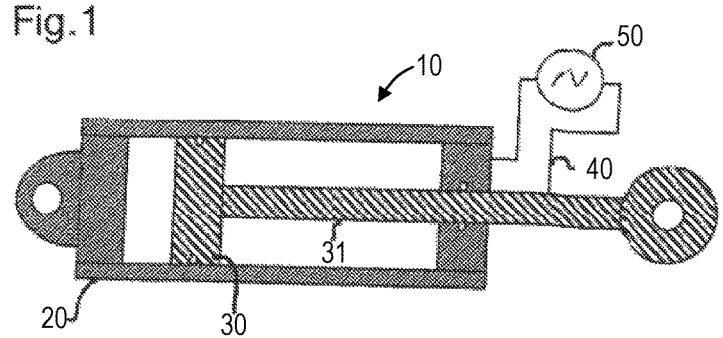
FIG. 1 shows a schematic view of a piston-cylinder unit with a resonance measuring device.

FIG. 1 shows a piston-cylinder unit 10 with a device for position determination. The construction of a piston-cylinder unit 10 is similar to a known piston-cylinder unit. In detail, the unit 10 comprises a tubular cylinder jacket 20 in whose cavity a piston 30 with arranged piston rod 31 is linearly shiftably mounted.

The piston-cylinder unit 10 may be used in construction machines 111 or hoisting implements, wherein a fixed implement is driven by the piston-cylinder unit 10. The construction machine 111 may alternatively, or additionally, be one or more of a hoisting implement, industrial machine, machine tool or aircraft. The automatic operation of the implement requires the precise position determination of the piston 30.

For the exact position determination the example of FIG. 1 makes use of the fact that by corresponding excitation the entire piston-cylinder unit 10 acts as electric resonant circuit. In detail, the piston 30 forms a first electrode of a resonant circuit and the cylinder jacket 20 forms the associated second electrode. Between the piston 30 and the cylinder jacket 20 a hydraulic medium, in particular hydraulic oil, is located in a hydraulic cylinder, which acts as dielectric between the two electrodes.

For excitation of the resonant circuit the oscillator 50 is used, which is connected both with the cylinder jacket 20 and with the piston rod 31 via the electric lines 40. After excitation of the resonant circuit via the oscillator 50, the same vibrates with its resonance frequency, wherein the impedance of the resonant circuit formed of piston 30, piston rod 31, cylinder jacket 20 and evaluation electronic 50 depends on the respective position of the piston 30 in the cavity of the cylinder. Since the capacitance or inductance of the resonant circuit influence the resonance frequency obtained, a conclusion as to the existing impedance of the piston-cylinder unit 10 and the position of the piston 30 can be made on the basis of the detected resonance frequency. For this purpose, a corresponding output voltage is picked off in the region of the oscillator 50 and analyzed or interpreted by a corresponding evaluation electronic.

Figure 2:
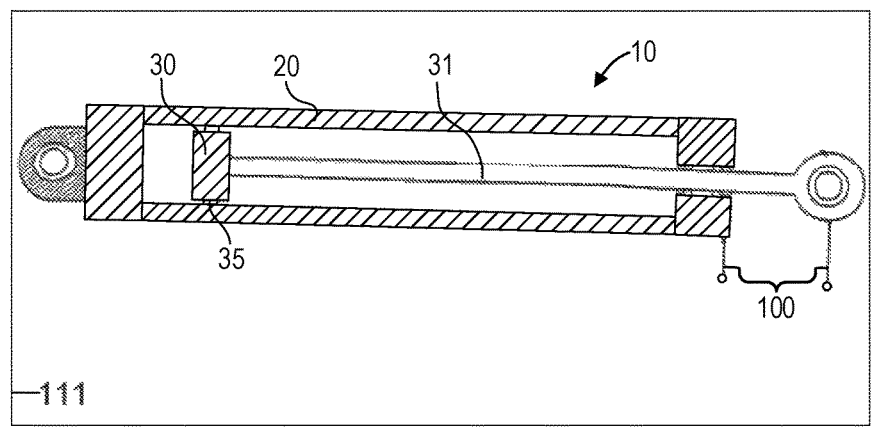
FIG. 2 shows a second representation of a piston-cylinder unit for carrying out an ohmic or inductive measurement method.

FIG. 2 shows an approximately identically constructed piston-cylinder unit 10, wherein here however the piston 30 is conductively connected with the cylinder jacket 20 via the contact ring 35. As compared to FIG. 1, the fact is exploited here that the ohmic and inductive properties of the piston-cylinder unit 10 vary in dependence on the piston position. To be able to evaluate the purely inductive and/or ohmic properties of the cylinder 10, a conductive connection must be created between the piston 30 and the cylinder jacket 20 or the inner wall of the cylinder jacket 20. This electrical contact is made possible by the piston ring 35 coaxially arranged on the piston circumference 30.

The evaluation unit (which may be evaluation unit 50 of FIG. 3) may be electrically conductively connected with the piston-cylinder unit 10 via the two pole connectors 100. The evaluation of these inductive and ohmic variables can be effected by an evaluation method based both on alternating voltage and on direct voltage. For an evaluation method based on direct voltage or an evaluation method based on alternating voltage with low frequency, the properties of the formed conduction path can roughly be described via the ohmic resistance and the inductance thereof. Both quantities are dependent on the line length and the position of the piston 30. If the evaluation unit uses a high-frequency alternating voltage for the evaluation, further quantities such as for example the inductance per unit length, the resistance per unit length, the leakage per unit length as well as the capacitance per unit length must be taken into account.

The evaluation unit also can be designed as measuring bridge which is connected with the pole connectors 100 and determines the ohmic resistance of the connected piston-cylinder unit 10 in dependence on the piston position. Beside the use of a measuring bridge as the evaluation unit, the inductive and/or ohmic variables of the piston-cylinder unit 10 also can be determined both by detecting the external resonance and by measuring the pulse response of the piston-cylinder unit via the evaluation unit. The evaluation unit may include various modules and connections, such as described herein, including circuits and/or instructions stored in memory for evaluating signals and displaying or relaying evaluated data as described herein. For example, the evaluation unit may determine the position of the piston rod with respect to the cylinder jacket on the basis of the intrinsic electrical properties of the piston cylinder unit, display the determined position, and/or transmit the determined position to another module or connected element so that one or more devices, such as an implement of a construction machine, may be automatically controlled by a control system responsive thereto.

Figure 3:
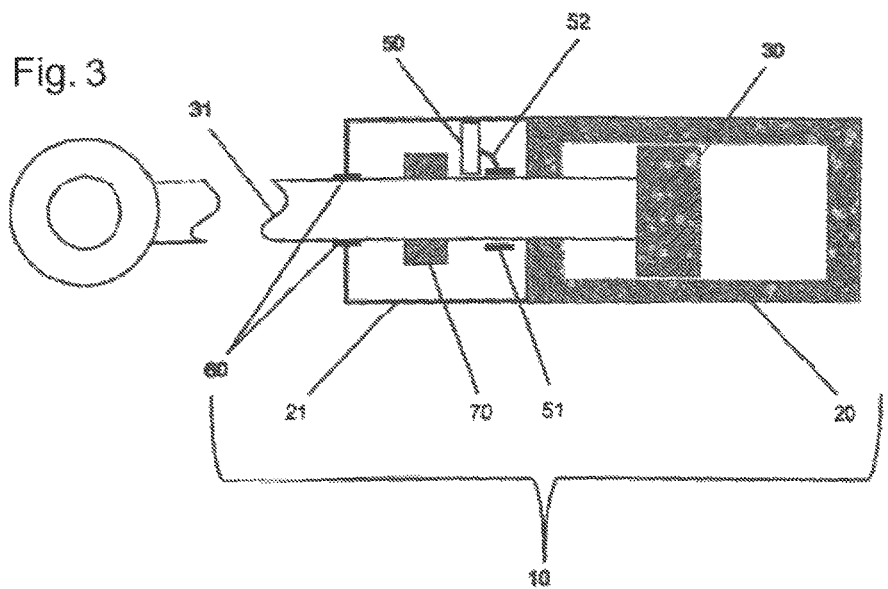
FIG. 3 shows a representation of the piston-cylinder unit according to the present disclosure with short-circuit contact.

FIG. 3 now shows the grounding of the piston rod in the region of the cylinder head according to the present disclosure. This novel grounding concept equally can be used both for the measurement method of FIG. 1 and for the measurement method according to FIG. 2.

The illustrated piston-cylinder unit 10 likewise comprises the cylinder jacket 20 as well as the piston rod 31 longitudinally shiftably guided therein with the piston 30 arranged at the end. Other than in FIGS. 1, 2, the necessary evaluation electronic inside the cylinder head 21 is connected to the piston rod 31 via the galvanic connection 52 and the connection 51. Furthermore, in contrast to the construction of FIGS. 1 and 2, the grounding is made not in the region of the piston rod eye, but the connection to the cylinder potential (cylinder jacket 20) is effected in the region of the exit opening of the piston rod 31 from the cylinder head 21. For this purpose, the short-circuit contact 60 is provided, which slidingly supports the piston rod 31 and electrically connects the same with the cylinder head 21. For this purpose, the electric junction is designed as full-area and/or point contact both in single and multiple form. Beside the bearing and contact function of the piston rod 31, the short-circuit contact 60 also can be designed as pure contact element, wherein then the bearing function is adopted by an additional mechanical component. Note that as described herein, a first element being positioned in a region of a second element may include the first element being within a threshold distance of the second element. It may also include the first element being adjacent and/or contiguous with the second element. It may further include the first element being within the second element.

The cylinder head 21 is galvanically conductively connected with the cylinder housing (cylinder jacket 20). In the mounting position, the piston-cylinder unit 10 is connected with the machine chassis, whereby due to construction a grounding of the piston rod 31 likewise is achieved in the outlet region via the piston rod eye. In this way, a contact of the piston rod 31 to the cylinder potential very effective in terms of high frequency is achieved, and there are obtained improvements in the suppression of emitted and irradiated electromagnetic signals. In addition, the insensitivity to EMI is improved and the electromagnetic radiation of the active position detection system 50 is reduced.

The shielding impedance is electrically parallel to the intrinsic resonant circuit of the piston-cylinder system. To resolve the short circuit caused by the introduced short-circuit contact 60 between connection 51 and cylinder head 21 (cylinder jacket 20) in terms of high frequency via the path of the piston rod 31 and the short-circuit contact 60, the shielding ring 70 is introduced. The same has a frequency-dependent impedance, which in turn is connected in series with the piston rod 31 and the short-circuit contact 60, i.e. the short-circuit branch. It thereby only becomes possible again to measure the intrinsic properties of the piston-cylinder system via the connection 51, the piston rod 31 in direction of the piston 30, and the cylinder jacket 20 with the evaluation unit 50 and its connection 52.

To obtain the desired EMI property, the piston rod 31 is short-circuited against the cylinder or cylinder head in a manner suitable for high frequencies. However, the short circuit caused thereby in turn prevents the evaluation of the intrinsic resonant circuit of the piston-cylinder system. To make this possible again, the short-circuit branch internally is resolved again in terms of high frequency by introducing a series impedance (shielding ring 70).

For the high-frequency decoupling of the piston rod 31 from the connection 51 in direction of the short-circuit contact 60, a shielding ring 70 of a permeable material is positioned around the piston rod 31. In the illustrated solution, the contact ring 51 of the connection now is in series with the shielding impedance of the shielding ring 70, so that small changes in resistance have less influence on the measurement. Furthermore, the system thereby is shielded such that a higher impedance is admissible for the connection.

Figure 4:
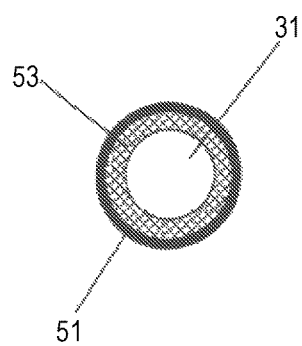
FIG. 4 shows a sectional representation of the capacitive connection of the evaluation unit.

The connection 51 either can be effected galvanically or by a capacitive coupling. For this purpose, FIG. 4 shows a possibility for a capacitive connection, in which a dielectrically insulated counterelectrode 53 is seated on the piston rod 31 concentrically or partly concentrically. Between evaluation electronic 50 and capacitive connection 51 a direct galvanic contact is effected. Due to the optimized shielding of the system, which is achieved by the short-circuit contact 60, a higher impedance is tolerated for the capacitive coupling 51, whereby a surface and volume reduction of the connection 51 is possible.

The invention claimed is:

1. A piston-cylinder unit with a cylinder jacket and a piston rod longitudinally shiftably guided in the cylinder jacket, as well as an evaluation unit which determines a position of the piston rod with respect to the cylinder jacket on the basis of intrinsic electrical properties of the piston-cylinder unit, wherein the piston rod is short-circuited against a cylinder or a cylinder head in a manner suitable for high frequencies via one or more contact elements in a region of an exit opening of the piston rod out of the cylinder head.

2. The piston-cylinder unit according to claim 1, wherein at least one shielding impedance is provided, which is connected in parallel with the intrinsic electrical properties of the piston-cylinder unit and/or in series with a short-circuit path.

3. The piston-cylinder unit according to claim 2, wherein the shielding impedance is arranged between a connection of the evaluation unit to the piston rod and a short-circuit contact, wherein a shielding ring of a permeable material is provided, which is coaxially seated on the piston rod.

4. The piston-cylinder unit according to claim 3, wherein the evaluation unit is galvanically connected with the piston rod.

5. The piston-cylinder unit according to claim 3, wherein the evaluation unit is capacitively connected with the piston rod.

6. The piston-cylinder unit according to claim 5, wherein the connection is effected by a dielectrically insulated counterelectrode, which is concentrically or partly concentrically guided around the piston rod and is galvanically connected with the evaluation unit.

7. The piston-cylinder unit according to claim 3, wherein the evaluation unit and/or the shielding impedance are at least partly arranged within the cylinder head.

8. The piston-cylinder unit according to claim 1, wherein a cylinder piston and the cylinder jacket are conductively connected with each other and the evaluation unit determines a piston position on the basis of inductive and/or ohmic properties of a conduction path formed.

9. The piston-cylinder unit according to claim 8, wherein the cylinder piston and the cylinder jacket are conductively connected with each other by an electrically conductive piston ring or sliding contact, which is arranged between the cylinder piston and the cylinder jacket.

10. The piston-cylinder unit according to claim 1, wherein the evaluation unit determines a piston position on the basis of an intrinsic capacitance of a capacitor formed by the cylinder jacket, the piston rod and a medium acting as dielectric within the cylinder.

11. The piston-cylinder unit according to claim 1, wherein the evaluation unit determines a resonance vibration behavior of a resonant circuit formed of the cylinder jacket, the piston rod and a piston, and determines a piston position on the basis of resonance vibration.

12. The piston-cylinder unit according to claim 11, wherein the evaluation unit includes an evaluation electronic module which determines a capacitance and/or the resonance vibration behavior by an oscillator circuit, and generates an output representative of the determined capacitance and/or the resonance vibration behavior.

13. The piston-cylinder unit according to claim 1, wherein the evaluation unit includes an evaluation electronic module which performs the evaluation on the basis of a measurement bridge, pulse response, impedance/phase measurement, complex standing-wave-ratio (SWR) measurement, multifrequency (MF), vectorial or scalar network analysis.

14. A machine, comprising:
a piston-cylinder unit with a cylinder jacket and a piston rod longitudinally shiftably guided in the cylinder jacket, as well as an evaluation unit which determines a position of the piston rod with respect to the cylinder jacket on the basis of intrinsic electrical properties of the piston-cylinder unit, wherein the piston rod is short-circuited against a cylinder or a cylinder head in a manner suitable for high frequencies via one or more contact elements in a region of an exit opening of the piston rod out of the cylinder head.

15. The machine of claim 14, wherein the machine is a construction machine.

16. The machine of claim 14, wherein the machine is a hosting implement.

17. The machine of claim 14, wherein the machine is an industrial machine.

18. The machine of claim 14, wherein the machine is an aircraft.

* * * * *